United States Patent
Shaffer et al.

(10) Patent No.: US 7,249,185 B1
(45) Date of Patent: Jul. 24, 2007

(54) METHODS, DEVICES AND SOFTWARE FOR REDUNDANT TRANSMISSION OF VOICE DATA OVER A PACKET NETWORK CONNECTION ESTABLISHED ACCORDING TO AN UNRELIABLE COMMUNICATION PROTOCOL

(75) Inventors: Shmuel Shaffer, Palo Alto, CA (US); Joseph F. Khouri, San Jose, CA (US); Michael E. Knappe, Sunnyvale, CA (US); John F. Wakerly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 09/702,196

(22) Filed: Oct. 30, 2000

(51) Int. Cl.
*G06F 15/16* (2006.01)
(52) U.S. Cl. ............... 709/228; 709/224; 709/231; 709/232; 714/748; 714/822
(58) Field of Classification Search ............... 709/227, 709/228, 231, 224, 232; 704/270.1; 714/748, 714/746, 822
See application file for complete search history.

(56) References Cited

U.S. PATENT DOCUMENTS

| | | | | |
|---|---|---|---|---|
| 5,640,415 A | * | 6/1997 | Pandula | 375/133 |
| 5,664,091 A | * | 9/1997 | Keen | 714/18 |
| 5,701,312 A | * | 12/1997 | DeLuca et al. | 714/748 |
| 5,754,787 A | * | 5/1998 | Dedrick | 709/228 |
| 5,881,069 A | * | 3/1999 | Cannon et al. | 714/748 |
| 5,896,402 A | * | 4/1999 | Kurobe et al. | 714/748 |
| 5,903,581 A | * | 5/1999 | Imazu | 714/752 |
| 5,914,956 A | * | 6/1999 | Williams | 370/395.41 |
| 5,954,839 A | * | 9/1999 | Park et al. | 714/699 |
| 6,081,907 A | * | 6/2000 | Witty et al. | 714/6 |

(Continued)

FOREIGN PATENT DOCUMENTS

JP 56146340 A * 11/1981

(Continued)

OTHER PUBLICATIONS

Perkins et al, "RTP Payload for Redundant Audio data", RFC 2198, Sep. 1997.*

(Continued)

*Primary Examiner*—Oanh Duong
(74) *Attorney, Agent, or Firm*—Marger Johnson & McCollom, P.C.

(57) ABSTRACT

Methods, devices, and software are provided for generating and sending data packets that contain redundant voice data over VoIP connections made under an unreliable network protocol. The redundant data is packaged either in redundant data packets, or in expanded original packets, to repeat data that originally belongs in other packets. Generation of the redundant voice data is either from the transmitting device or from a retransmitting device, such as a router in the network. Generation is triggered either when errors are detected, or simply when the network resources permit it, or both. The received voice data is processed by the second party to the connection, which is typically a telephone call. The redundant voice data that is actually received is discarded. The invention thus ensures that less voice data is lost than in the prior art over VoIP connections made under an unreliable network protocol.

24 Claims, 4 Drawing Sheets

U.S. PATENT DOCUMENTS

| | | | |
|---|---|---|---|
| 6,169,728 B1* | 1/2001 | Perreault et al. | 370/235 |
| 6,170,075 B1* | 1/2001 | Schuster et al. | 714/776 |
| 6,366,959 B1* | 4/2002 | Sidhu et al. | 709/231 |
| 6,434,606 B1* | 8/2002 | Borella et al. | 709/214 |
| 6,466,574 B1* | 10/2002 | Fujisaki et al. | 370/356 |
| 6,467,041 B1* | 10/2002 | Blam | 713/310 |
| 6,487,603 B1* | 11/2002 | Schuster et al. | 709/231 |
| 6,496,520 B1* | 12/2002 | Acosta | 370/474 |
| 6,516,435 B1* | 2/2003 | Tsunoda | 714/751 |
| 6,530,055 B1* | 3/2003 | Fukunaga | 714/746 |
| 6,539,205 B1* | 3/2003 | Wan et al. | 370/465 |
| 6,560,650 B1* | 5/2003 | Imai | 709/227 |
| 6,574,668 B1* | 6/2003 | Gubbi et al. | 709/237 |
| 6,587,985 B1* | 7/2003 | Fukushima et al. | 714/748 |
| 6,665,726 B1* | 12/2003 | Leighton et al. | 709/231 |
| 6,700,893 B1* | 3/2004 | Radha et al. | 370/412 |
| 2001/0041981 A1* | 11/2001 | Ekudden et al. | 704/270.1 |
| 2001/0056560 A1* | 12/2001 | Khan et al. | 714/746 |

FOREIGN PATENT DOCUMENTS

| | | | |
|---|---|---|---|
| JP | 62248315 A | * | 10/1987 |
| JP | 09219649 A | * | 8/1997 |

OTHER PUBLICATIONS

Levenshtein, "Efficient reconstruction of sequences", Information Theory, IEEE Transactions on Vol. 47, Issue 1, Jan. 2001, pp. 2-22.*

Miller et al., "Cumulative acknowledgement multicast repetition policy for wireless LANs or ad hoc network clusters", Communications, 2002. ICC 2002. IEEE International Conference on Vol. 5, Apr. 2 May 2002, pp. 3403-3407.*

De Munnynck, M. et al., "Queueing analysis of some continuous ARQ strategies with repeated transmission", Electronics Letters, vol. 38, Issue 21, Oct. 2002, pp. 1292-1297.☐☐*

Yu, T. et al., "Reliable multicast protocol by sequence (RMPS)", IEEE VTS Vehicular Technology Conference, abstract, Spring 2001.*

Uhlemann, E. et al., "Incremental redundancy deadline dependent coding for efficient wireless real-time communications", 10th IEEE International Conference on Emerging Technologies and Factory Automation, Abstract, 2005.*

Kung, S. et al. "An efficient retransmission mechanism for multicast protocol", Journal of KISS, abstract, Sep. 1997.*

Kim, E. et al., "A restricted retransmission mechanism for error recovery in a multicast group", Journal of KISS; abstract, Aug. 1999.*

Park, S. et al., "Performance analysis of dual-mode selective repeat ARQ mechanism for wireless data service", PIMRC'99, abtract, 1999.*

* cited by examiner

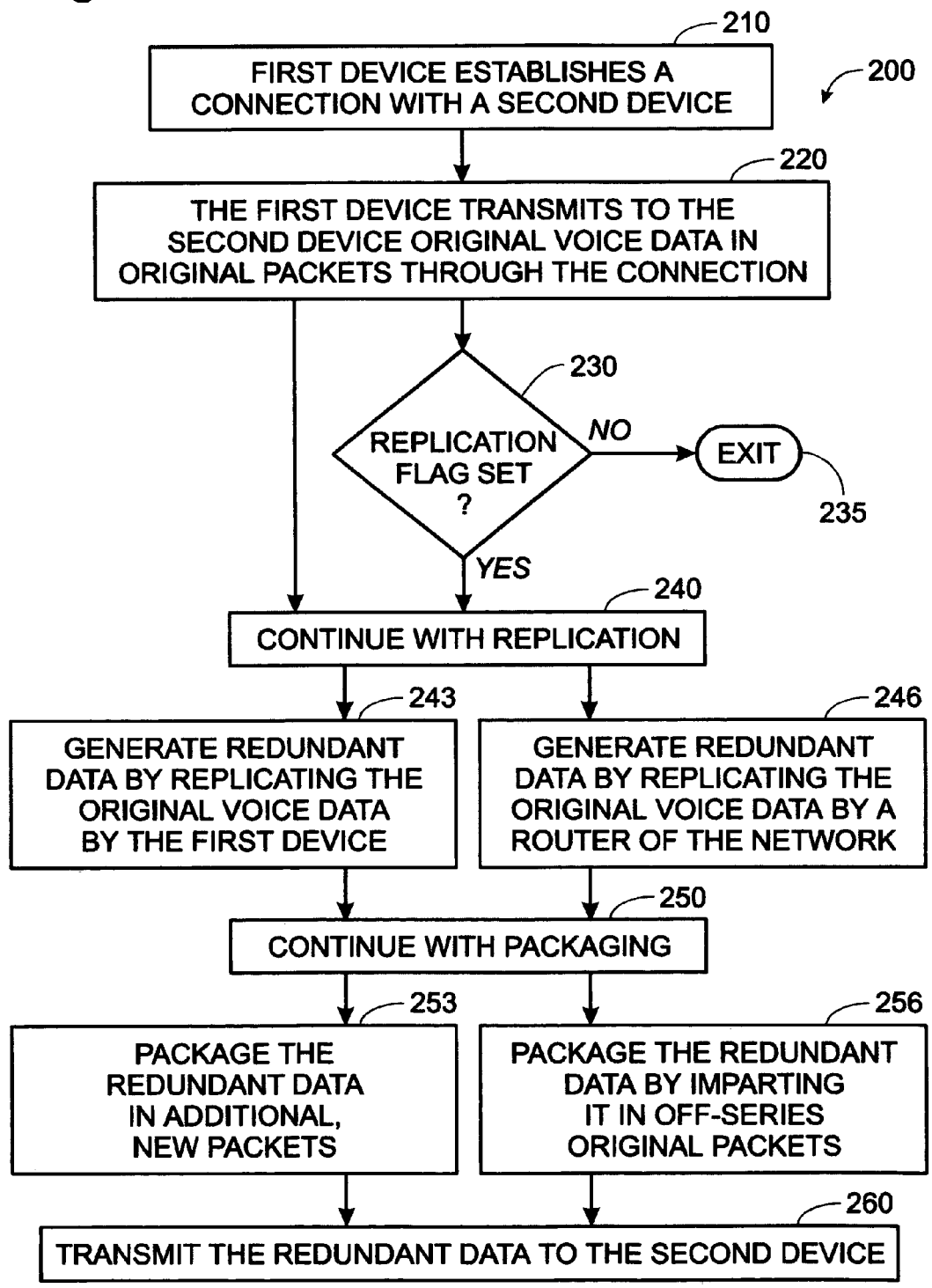

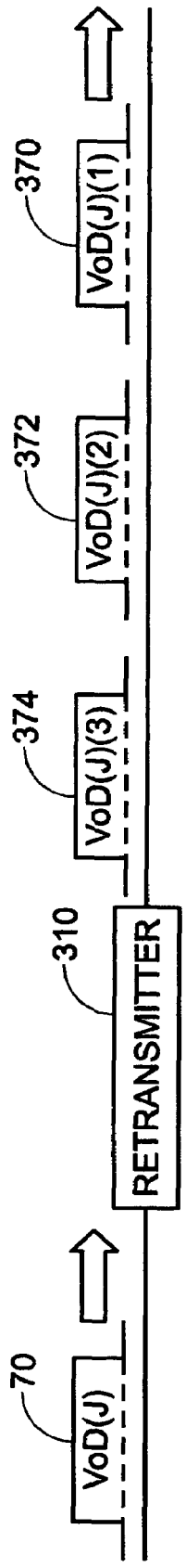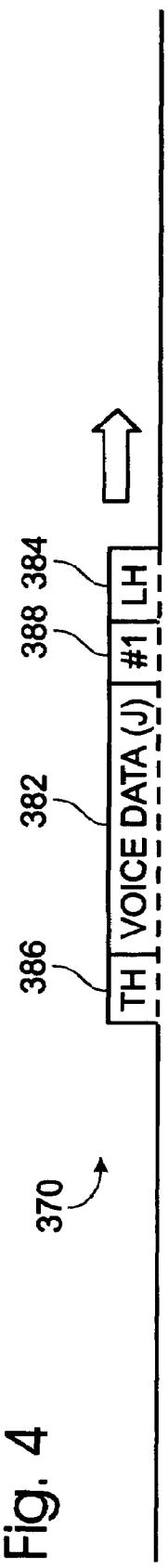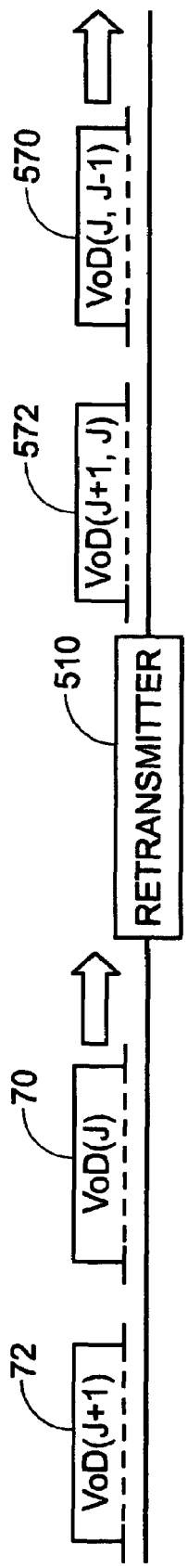

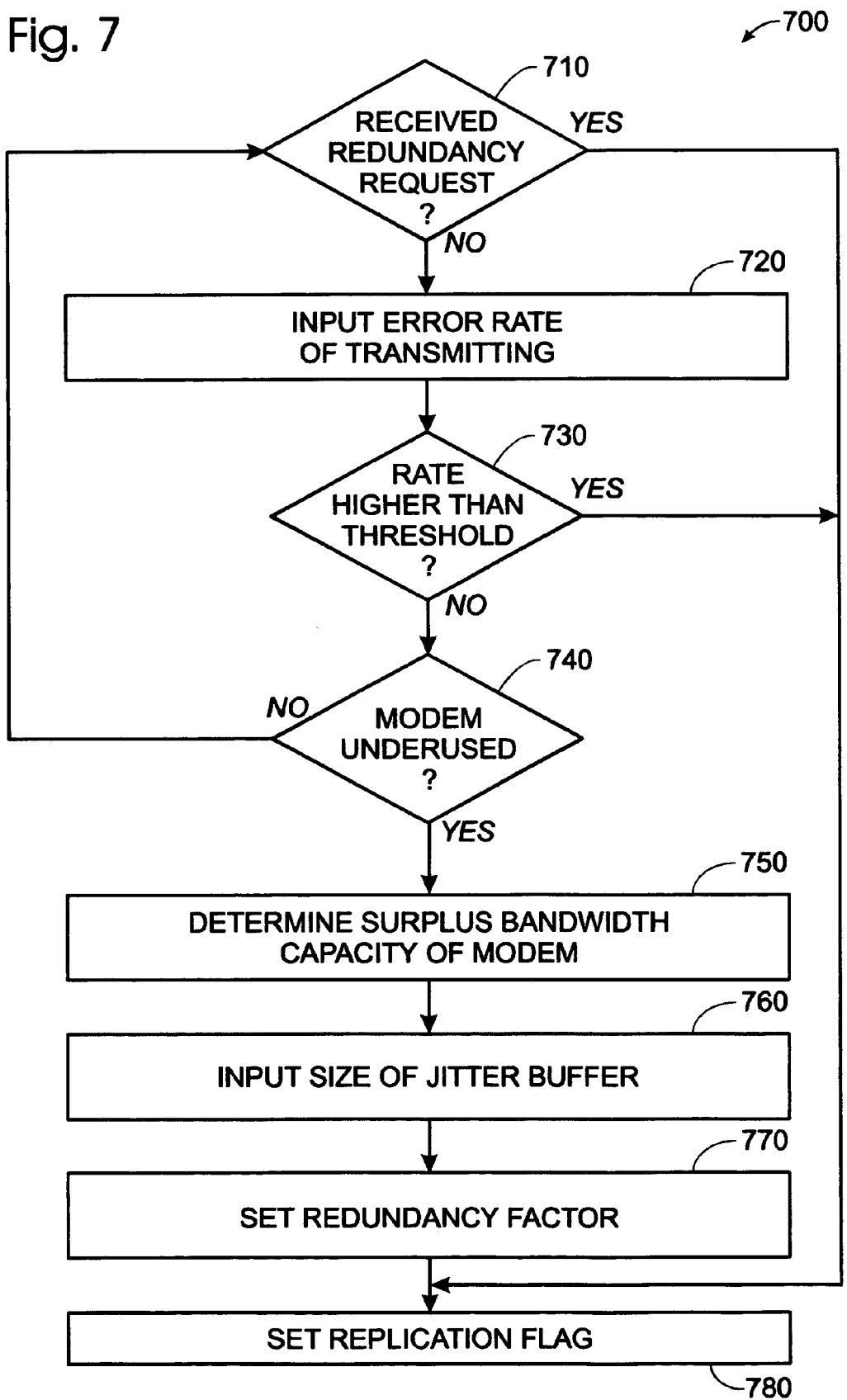

METHODS, DEVICES AND SOFTWARE FOR REDUNDANT TRANSMISSION OF VOICE DATA OVER A PACKET NETWORK CONNECTION ESTABLISHED ACCORDING TO AN UNRELIABLE COMMUNICATION PROTOCOL

BACKGROUND OF THE INVENTION

1. Field of the Invention

The present invention is related to the field of using data packets to transmit voice data for network telephony, and more specifically to methods, devices and software for transmitting such data packets over connections of packet networks that are made according to unreliable communication protocols.

2. Description of the Related Art

Telephone calls are made through packet networks by rendering sound into voice data, organizing the voice data in packets, and then transmitting the packets through the network. Transmission is over a network connection that is made under a protocol for voice. Such protocols are collectively known as "voice over internet protocol", and are abbreviated as VoIP.

A certain characteristic of voice data permits significant savings in network resources, especially as contrasted in transmitting file data. Each packet contains such a small portion of the overall voice data. The characteristic is that, due to how a human hearing works, it is acceptable if some voice data packets are lost. This enables using an imperfect communication protocol over the packet network for transmitting the voice data.

Imperfect communication protocols are often called unreliable communication protocols. They are also called, more generally, faulty or error prone protocols. One of their features is that they do not retransmit packets, even when errors are detected. Digital Signal Processing (DSP) at the end point may recover in case of loss of a single packet by reconstructing it. If, however, multiple voice packets are lost, the voice degradation is perceptible.

A usual choice of a faulty communication protocol is the so-called unreliable data protocol (UDP) for transmitting the voice data. The UDP does not require a confirming handshake for transferring a packet between successive network nodes. This uses less bandwidth of the network than, for example, the resource intensive TCP/IP network protocol for transmitting file data. (But then again, the TCP/IP network protocol is used for transmitting file data, where no losses are tolerated.)

When data is transmitted over an IP network using the UDP protocol, some of the voice packets are lost. When that happens, the quality of a telephone conversation is degraded, which is undesirable. Still, the UDP network protocol is used because it conserves significant network resources. In addition, its operation is better suited to work with the real time nature of voice communication. In contrast, the TCP/IP protocol does not yield good real time results due to asking for confirmation of transmission of packets.

BRIEF SUMMARY OF THE INVENTION

The present invention overcomes these problems and limitations of the prior art.

Generally, the present invention provides methods, devices, and software for generating and sending data packets that contain redundant voice data over connections made under an unreliable network protocol. The redundant data is packaged either in redundant data packets, or in expanded original packets, to repeat data that was originally transmitted in other packets.

Generation of the redundant voice data is either from the transmitting device or from a retransmitting device, such as the router that is the point of entry to the network for the transmitting device. Generation is triggered either when errors or packet loss are detected, or simply when the network resources permit it, or both.

The received voice data is processed by the second party to the connection, which is typically a telephone call. If at least one redundant copy is received, then the voice data can be reconstructed completely. Any additional redundant copies that are actually received are discarded. The invention thus ensures fewer errors in reconstructing voice data than in the prior art.

The invention will become more readily apparent from the following Detailed Description, which proceeds with reference to the drawings, in which:

BRIEF DESCRIPTION OF THE DRAWINGS

FIG. 2 is a flowchart for illustrating a method of redundant voice data transmission according to the invention.

FIG. 3 is a diagram illustrating how a single data packet is retransmitted redundantly according to the invention.

FIG. 4 is a diagram showing a detail of one of the retransmitted data packets of FIG. 3.

FIG. 5 is a diagram illustrating how information of the single data packet is repeated redundantly in the subsequent data packet.

FIG. 6 is a diagram showing a detail of the subsequent data packet of FIG. 5.

FIG. 7 is a flowchart for illustrating a method of setting a replication flag according to the invention.

DETAILED DESCRIPTION OF THE PREFERRED EMBODIMENT(S)

Figure 1:
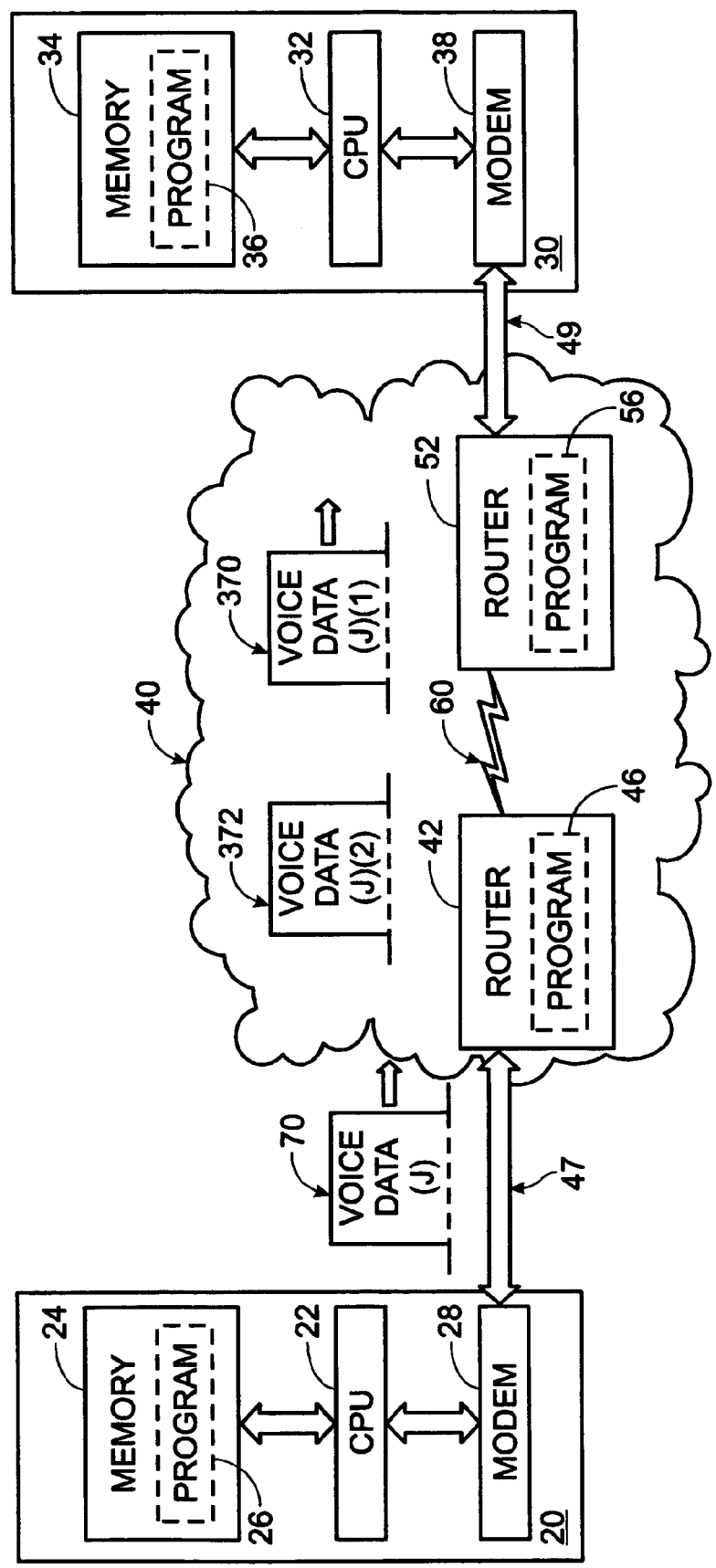
FIG. 1 is a diagram for illustrating generating and transmitting redundant voice data according to an embodiment of the invention.

As has been mentioned, the present invention provides methods, devices and software for transmitting voice data over a packet network connection established according to an unreliable communication protocol. The transmission is redundant, which alleviates errors.

Referring now to FIG. 1, an arrangement according to the invention is described.

A first device 20 can be a personal computer, a personal digital assistant, or any other device that can communicate with another device through a network. The first device 20 includes a CPU 22, and a memory 24. In memory 24 there is a program 26, such as a software program. The first device 20 also includes a modem 28 for electronic communication through a network.

Similarly, a second device 30 can be a personal computer, a personal digital assistant, or any other device that can communicate with another device through a network. The second device 30 includes a CPU 32 and a memory 34. The memory 34 includes a program 36. The second device that he also includes a modem 38 for electronic communication through a network.

A network 40 includes at least one router 42, which includes a program 46. In addition, the network 40 includes at least one router 52, which includes a program 56. Programs 46 and 56, if embodied as software programs, are included in memories (not shown) of the routers 42 and 52.

Router 42 is the entry point for first device 20 in the network 40. In other words, router 42 is at the entry node of the network 40 for first device 20. This is accomplished by connection 47. Similarly, router 52 is the entry point for second device 30 in the network 40. This is accomplished by connection 49.

The network 40 can support a connection 60 between router 42 and router 52 under a faulty or unreliable communication protocol. Similarly, connections 47 and 49 are governed by the same protocol as link 60. In other words, connection 60 permits the first device 20 to communicate with the second device 30.

From the description that follows, it will be appreciated that invention can be practiced by any one combination of the first device 20, the second device 30, the components of the network 40 and the associated software programs.

Referring now also to FIG. 2, a flowchart 200 a shown. The flowchart 200 is for illustrating a method according to the invention.

According to a box 210, the first device 20 establishes a connection with the second device 30. This is according to a faulty or unreliable network communication protocol. The connection is via links 47, 60, 49. Accordingly, a communication channel (and pipe) is opened.

According to a next box 220, the first device transmits to the second device original voice data through the established connection. The original voice data is packaged in original data packets, such as a packet 70 of FIG. 1.

According to one embodiment of invention, it is then checked whether replication of the voice data is desired. More particularly, according to a next box 230, it is checked whether a replication flag has been set. The replication flag is implemented preferably in software. If the replication flag has not been set, then according to a next box 235 that part of the method ends there.

If the replication flag has been set, then according to a box 240, the method of invention proceeds with replication. Alternately, if there is no feature for checking whether a replication flag has been set, the execution proceeds from box 220 directly to box 240.

Replication according to the invention can happen in a number of ways. Two such ways are described, although more such ways will become apparent to a person skilled in the art in view of the present description.

According to a box 243, the first device 20 replicates the original voice data to generate redundant data. In this embodiment, the CPU 22 acts as a retransmitter and initiates retransmission.

According to an alternate box 246, the router 42 replicates the original voice data upon receiving them, to generate the redundant data. In this embodiment, router 42 acts as a retransmitter. Alternately, another router in the network can generate the redundant data.

Regardless of which way is used, a next step 250 according to the invention is to continue with packaging to generate redundant voice data. Packaging according to the invention can happen in a number of ways. Two such ways are described with reference to box 253 and box 256. Both of these ways use a single device as a retransmitter, and also simultaneously as a generator of the redundant packages.

More ways will become apparent to person skilled in the art upon reading the present description. For example, combinations of these two ways can also be used, etc.

According to a box 253, the redundant data is packaged in additional, new packets. This increases the number of packets being transmitted, but the size of each packet remains substantially unaffected.

Referring to FIG. 3, the embodiment of box 253 is elaborated on further. An original voice data packet VoD(J) 70 is passed through an effective retransmitter 310. J is an index for denoting the sequence of the packet in the stream or series.

The retransmitter 310 is either the end point device 20, or the router 42, or the router 52, depending on the mode of replication described above. The retransmitter 310 in turn generates three data packets 370, 372, 374, and transmits them to the destination device. Notice that the index J is the same for each of the three packets 370, 372, 374. In addition, these three packets carry respective redundancy indices (1), (2), (3), etc.

Referring now to FIG. 4, the syntax of voice packet 370 is described in more detail. It includes bits 382 for the voice data of original voice packet 70. In addition, it includes bits 384 for a leading header, and bits 386 for a trailing header. In addition, it preferably includes bits 388 for a redundancy index. The redundancy index is number 1, to denote that packet 370 is the first of the retransmitted packets that include this voice data.

The syntax of packets 372, 374 can be identical to that of packet 370, except that the redundancy index would correspondingly be numbers 2 and 3, respectively. Once one of them is received, the other ones can be discarded.

In another embodiment, the redundancy may be inferred from the time stamp and the packet serial number, which are part of the Real Time Communication (RTCP) protocol.

Each of the three data packets 370, 372 and 374 includes the voice data of original voice packet 70. If transmission were perfect, only the first one would be necessary. In that case, only data packet 370 would be necessary. Packets 372 and 374 are redundant packets, in order to compensate for the transmission being error prone.

It will be observed that, in the scheme of FIGS. 3 and 4, there was a replication factor of 3. More particularly, for every one original voice data packet 70, three are sent. The replication factor can be different, depending on network resources, etc.

Briefly referring to FIG. 1, the redundancy is also demonstrated, with a replication factor of two. An original voice packet 70 is sent to router 42, which acts as a retransmitter. Router 42, preferably through its program 46, produces two voice packets 370, 372.

Returning now to FIG. 2, another embodiment of packaging is described. According to a box 256, the redundant data is packaged by being imparted in off-series original packets. This increases the size of each packet being transmitted, but leaves their number relatively unaffected.

Referring now also to FIG. 5 and FIG. 6, the embodiment of box 256 is described in more detail. More particularly, in FIG. 5 a series of two successive voice packets 70, 72 a received by a retransmitter 510. Again, the retransmitter 510 is either the CPU 22, or the router 42, depending on the mode of replication. The retransmitter 510 outputs a series of two successive retransmitted voice packets, 570, 572.

Referring now to FIG. 6, the syntax of voice packet 572 is described in more detail. It includes bits 582 corresponding to the voice data of its corresponding packet 72. It also includes bits 584 for a leading header, and bits 586 for a trailing header. The leading header contains information about the number of replicated packets and the size of each packet. Moreover it includes bits 588 that repeat the voice data of the prior corresponding original voice data packet 70.

In other words, the voice data of packet 70 is regularly transmitted by packet 570, and redundantly transmitted again by packet 572.

The scheme of FIG. 5 and FIG. 6 is more efficient than that of FIG. 3 and FIG. 4. Indeed, after voice compression, the payload of the voice data is very few bits—fewer than the headers. It is more economical to package the redundant voice compression bits in a packet, than sending them in a separate package.

Returning now to FIG. 2, according to a box 260, the redundant data is transmitted to the second device after having been packaged.

Returning now to FIG. 1, it will be appreciated that the method of invention is optimized when all the components cooperate. For example, the second device 30 receives the data from the network throughout the router 52. More particularly, the CPU 32 receives the data through modem 38. The program 56 of router 52 and the program 36 in memory 34 have to plan for discarding the redundant data. Discarding will be implemented in accordance with how packaging was made.

It is readily apparent that the present invention can be implemented in logic circuitry, in a dedicated microcontroller circuit, or in a computer device that is adapted with software. The computer device can be a general-purpose computer, or any device that operates in conjunction with a network. Such can embody the components described above, and also perform the methods that are described below.

The invention provides a program, which is most advantageously implemented as a computer program.

This detailed description is presented largely in terms of display images, algorithms, and symbolic representations of operations of data bits within a computer readable medium, such as a memory. These algorithmic descriptions and representations are the means used by those skilled in the data processing arts to most effectively convey the substance of their work to others skilled in the art. A person skilled in the art of programming can use this description to readily generate specific instructions for implementing a program according to the present invention.

Often, for the sake of convenience only, it is preferred to implement and describe a program as various interconnected distinct software modules or features, also known as software. This is not necessary, however, and there may be cases where modules are equivalently aggregated into a single program with unclear boundaries.

In any event, the software modules or features of the present invention can be implemented by themselves, or in combination with others. Again, the combination can result in distinct software modules, or ones with blurred boundaries.

An algorithm is here, and generally, a self consistent sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated. When stored, they can be stored in any computer-readable medium. It is convenient at times, principally for reasons of common usage, to refer to these signals as bits, values, elements, symbols, characters, images, terms, numbers, or the like. It should be borne in mind, however, that all of these and similar terms are associated with the appropriate physical quantities and are merely convenient labels applied to these quantities.

In the present case, the method of the invention is implemented by machine operations. These can be optionally performed in conjunction with a human operator. Useful machines for performing the operations of the present invention include general purpose digital computers or other similar devices. In all cases, there should be borne in mind the distinction between the method of operating a computer and the method of computation itself. The present invention relates to method steps for operating a computer and processing electrical or other physical signals to generate other desired physical signals.

Another aspect of the present invention relates to apparatus for performing these operations. This apparatus may be specially constructed for the required purposes or it may comprise a general purpose computer selectively activated or reconfigured by a computer program stored in the computer. The algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from the description given below.

The program can be stored in a computer-readable medium, such as a computer memory, a microprocessor, etc. But it should be clear to a person skilled in the art that the program of the invention need not reside in a single memory, or even a single machine. Various portions, modules or features of it can reside in separate memories, or even separate machines. The separate machines may be connected directly, or through a network, such as a local access network (LAN), or a global network, such as what is presently known as the Internet. Similarly, the users need not be collocated with each other, but each only with a machine that houses a portion of the program. Alternately, some of these machines can operate automatically, without users.

An aspect of the program of the invention would be to set the replication flag, as described in box 230 of FIG. 2. The flag can be set depending on a combination of factors. It will be appreciated that the invention provides versatility in its design. Indeed, any number of factors can be used.

Referring now to FIG. 7, a flowchart 700 illustrates a method for setting the replication flag. This method is not only possible method, and other methods can be used. For example, they can be variants of this method. The method can be practiced while the connection is being established, or afterwards.

According to box 710, it is inquired whether a redundancy request was received. If yes, then according to box 770 replication flag is set.

The redundancy request must be received by the device that will be acting as retransmitter according to the invention. The redundancy request can thus be issued by any one of the components participating in the connection 60. This means that the redundancy request can be issued by the CPU 22, router 42, router 52, the CPU 32, or their associated programs. Issuing the request can be automatic.

If a redundancy request has not been received, then a number of working parameters can be checked independently. For example, according to a box 720, an error rate of transmitting is input. It can be an instantaneous link error rate, or other equivalent. According to a box 730, it is inquired whether the input error rate is higher than a threshold. If it is, then execution proceeds to box 770, and the replication flag set.

Even if the error rate is not higher than a threshold, it can be inquired according to a box 714 whether an associated modem is under utilized (which is also known as under used). This can be modem 28 or modem 38, or both. If they're not under utilized, the execution can return to box 710.

It is quite possible that the modem is being under utilized. For example, a 56 Kbps modem carrying only speech is sometimes used at the rate of 8 Kbps. In that case, the modem can handle more capacity. Then redundant voice data is preferably generated according to the invention. And, since the modem 28 is so underused, the redundant data can be generated at the CPU 22. On the other hand, if the modem 28 were being used closer to its full capacity, it would be desirable to make the transmitter be the router 42. Accordingly, the router 42 would receive the redundancy request. Then the redundant data would be generated past the bandwidth constriction of the modem 28. Similar and independent tradeoffs can be made for each segment, and in each direction.

If the modem is under used, then according to box 750, the modem's surplus bandwidth capacity is determined, in order to compute a replication factor. The replication factor is also known as redundancy factor. The redundancy factor is preferably controlled dynamically by the data traffic.

Also, according to a box 760, the size of a jitter buffer of device 30 is inquired. Once the jitter buffer size is input, it is taken into account to determine how much redundancy device 30 can handle. The jitter buffer is associated with a memory of device 30, such as memory 34.

Then according to box 770, a redundancy factor is set depending on the determined surplus bandwidth capacity. The redundancy factor can be "repeat once", "repeat twice", etc.

Then according to box 780, the replication flag is set. Optionally and preferably replication flag carries with it the set redundancy factor.

In addition to setting the replication flag, a request for securing the additional bandwidth is made via the Reservation Protocol (RSVP).

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

Additional implementation details will become apparent to a person skilled in the art in view of the present description. For example, the flag that has been set will need to be reset. That can be done at the end of the connection. It can also be done in conjunction with detecting increased network traffic, etc.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A method of transmitting voice data in a network, comprising:
    establishing a connection between a first device and a second device through a packet switched network using a packet switched network communications protocol;
    transmitting, from the first device, the voice data in at least one original packet to the second device through the connection;
    determining a replication factor at the first device, wherein the determined replication factor is a number of replication packets of the at least one original packet to be made;
    generating replication packets for the at least one original packet, by the first device, corresponding to the determined replication factor; and
    transmitting, from the first device, the generated replication packets to the second device, each of the generated replication packets includes an index of the at least one original packet, the determined replication factor, and a redundancy index, wherein the index of the at least one original packet indicates a sequence of the at least one original packet in a voice data stream, and the redundancy index indicates a redundancy sequence number of the each of the generated replication packets that includes the voice data.

2. The method of claim 1, further comprising:
    determining if a replication flag has been set;
    if the replication flag has been set, determining the replication factor comprising determining an under-utilization of a modem.

3. The method of claim 2, further comprising setting the replication flag based on either reception of a redundancy request or a comparison of an input error rate to a threshold.

4. The method of claim 1, wherein determining the replication factor comprising determining an under utilization of a modem, network resources, or a redundancy request.

5. The method of claim 1, wherein transmitting the generated replication packets comprising transmitting redundant voice data of the voice data as additional voice packets.

6. The method of claim 5, wherein transmitting the redundant voice data as the additional voice packets comprising transmitting the additional voice packets with redundancy indices.

7. The method of claim 1, wherein transmitting the redundant voice data as additional data in off-series original packets.

8. The method of claim 1, wherein transmitting, from the first device, comprising transmitting from one of a transmitting endpoint and a router between the transmitting endpoint and the second device.

9. A first device to transmit voice data in a network, comprising:
    a modem for establishing a connection from the first device to a second device through a packet switched network using a packet switched network communications protocol;
    a processor to:
        transmit, from the device, the voice data in at least one original packet to the second device through the connection;
        determine a replication factor at the first device, the determined replication factor is a number of replication packets of the at least one original packet to be created;

generate replication packets for the at least one original packet, by the first device, corresponding to the determined replication factor; and transmit, from the first device, the generated replication packets to the second device, each of the generated replication packets includes an index of the at least one original packet, the determined replication factor, and a redundancy index, wherein the index of the at least one original packet indicates a sequence of the at least one original packet in a voice data stream, and the redundancy index indicates a redundancy sequence number of the each of the generated replication packets that includes the voice data.

10. The first device of claim 9, the processor further to:
determine if a replication flag has been set;
if the replication flag has been set, determine the replication factor comprising determining an under-utilization of the modem.

11. The first device of claim 9, the processor to determine the replication factor depending upon one of the under utilization of the modem, network resources, and a redundancy request.

12. The first device of claim 9, the processor to transmit redundant voice data of the voice data as additional voice packets.

13. The first device of claim 9, the processor to transmit the redundant voice data as the additional voice packets with redundancy indices.

14. The first device of claim 9, the processor to transmit the redundant voice data as the additional voice packets in off-series original packets.

15. The first device of claim 9 further comprising a transmitting endpoint or a router between the transmitting endpoint and the second device.

16. An article of computer-readable storage medium containing instructions, that when executed by a computer for transmitting voice data in a network, cause the computer to:
establish a connection between a first device and a second device through a packet switched network using a packet switched network communications protocol;
transmit, from the first device, the voice data in at least one original packet to the second device through the connection;
determine a replication factor at the first device, the determined replication factor is a number of replication packets of the at least one original packet to be created;
generating replication packets for the at least one original packet, by the first device, corresponding to the determined replication factor; and
transmitting, from the first device, the generated replication packets to the second device, each of the generated replication packets includes an index of the at least one original packet, the determined replication factor, and a redundancy index, wherein the index of the at least one original packet indicates a sequence of the at least one original packet in a voice data stream, and the redundancy index indicates a redundancy sequence number of the each of the generated replication packets that includes the voice data.

17. The article of claim 16, the instructions further to cause the computer to:
determine if a replication flag has been set;
if the replication flag has been set, the instructions causing the computer to determine the replication factor further causing the computer to determine an under-utilization of a modem.

18. The article of claim 17, the instructions causing the computer to set the replication flag based upon either reception of a redundancy request or a comparison of an input error rate to a threshold.

19. The article of claim 16, the instructions causing the computer determine the replication factor based upon the under utilization of the modem, network resources, or a redundancy request.

20. The article of claim 16, the instructions causing the computer to transmit redundant voice data of the original voice data as additional voice packets.

21. The article of claim 16, the instructions causing the computer to transmit the redundant voice data as the additional voice packets in off-series original packets.

22. A first device to transmit voice data in a network, comprising:
means for establishing a connection between the first device and a second device through a packet switched network using a packet switched network communications protocol;
means for transmitting, from the first device, the voice data in at least one original packet to the second device through the connection;
means for determining a replication factor, the determined replication factor is a number of replication packets of the at least one original packet to be created;
means for generating replication packets for the at least one original packet, by the first device, corresponding to the determined replication factor; and
means for transmitting, from the first device, the generated replication packets to the second device, each of the generated replication packets includes an index of the at least one original packet, the determined replication factor, and a redundancy index, wherein the index of the at least one original packet indicates a sequence of the at least one original packet in a voice data stream, and the redundancy index indicates a redundancy sequence number of the each of the generated replication packets that includes the voice data.

23. The first device of claim 22, further comprising:
means for determining if a replication flag has been set;
means for determining the replication factor comprising determining an under-utilization of a modem, if the replication flag has been set.

24. The first device of claim 22, comprising a transmitting endpoint or a router between the transmitting endpoint and the second device.

* * * * *

UNITED STATES PATENT AND TRADEMARK OFFICE
CERTIFICATE OF CORRECTION

PATENT NO. : 7,249,185 B1
APPLICATION NO. : 09/702196
DATED : July 24, 2007
INVENTOR(S) : Shmuel Shaffer et al.

It is certified that error appears in the above-identified patent and that said Letters Patent is hereby corrected as shown below:

At column 10, line 13, please replace "computer determine" with
--computer to determine--

Signed and Sealed this

Fourth Day of December, 2007

JON W. DUDAS
*Director of the United States Patent and Trademark Office*